United States Patent [19]
Aizawa et al.

[11] 3,829,868
[45] Aug. 13, 1974

[54] CAMERA HAVING A RETAINABLE EXPOSURE CONTROL DEVICE

[76] Inventors: Hiroshi Aizawa, 2130 Yamazaki-cho, Machida-shi, Tokyo; Akio Sunouchi, 872 Shimonoge, Kawasaki-shi, Kanagawa-ken; Mitsutoshi Ogiso, 458-3 Shimokuchi Nitta-machi, Kawasaki-shi, Kanagawa-ken, all of Japan

[22] Filed: Mar. 26, 1973

[21] Appl. No.: 345,139

[30] Foreign Application Priority Data
Mar. 30, 1972 Japan .................. 47-31968

[52] U.S. Cl. .................. 354/45, 354/173
[51] Int. Cl. .................. G03b 7/12
[58] Field of Search ............... 95/10 C; 354/45, 173

[56] References Cited
UNITED STATES PATENTS
3,498,192  3/1970  Ito et al. .................. 95/10
3,696,718  10/1972  Tanaka .................. 95/10

*Primary Examiner*—Samuel S. Matthews
*Assistant Examiner*—Michael L. Gelliner
*Attorney, Agent, or Firm*—Flynn & Frishauf

[57] ABSTRACT

A TTL (Through the Taking Lens) photometry single lens reflex camera having a motor drive means mounted detachably or in a built-in manner. A camera having a retainable exposure control device which can repeatedly take a photograph in such a manner that in the case the photographing period is short, a pointer of meter as an EE (Electric Eye) mechanism element is clamped in the photometry taken before photographing, and maintaining or retaining said clamping condition to put the EE mechanism inoperative and which further can repeatedly take a photograph in such a manner that in the case the photographing period is long, the EE mechanism is operated following the pointer of meter.

4 Claims, 2 Drawing Figures

CAMERA HAVING A RETAINABLE EXPOSURE CONTROL DEVICE

BACKGROUND OF THE INVENTION

1. Field of the Invention

This invention is directed to improvements in camera systems having a retainable exposure control device, and to an improved camera system which is particularly useful in the case the TTL photometry single lens reflex camera employs a power drive.

2. Description of the Prior Art

With various prior art TTL single lens reflex cameras adapted to take a photograph with a motor drive means attached to the camera provided with an EE mechanism it is often hard to make proper exposures, when the photographing period is short, even if an attempt is made to obtain a proper diaphragm aperture by holding the meter pointer with a saw-tooth each time, through the EE mechanism in interlocking with a shutter release in each photographing operation, because the meter pointer is vibrated due to a mechanical vibration and the saw-tooth member may have held it before the vibration stopped.

SUMMARY OF THE INVENTION

The invention eliminates the disadvantages noted above and has its primary object to provide a camera having a retainable exposure control device which can always make proper exposures even in case of a short photographing period.

It is another object of this invention to provide a camera having a retainable exposure control device which indicates whether a meter pointer is to be clamped namely, a photograph is taken with photometry prior to photographing, or EE photographing is taken by way of an mechanism.

Thus, the invention provides a camera having a retainable exposure control device wherein, in case the photographing period is short, a meter pointer as an EE mechanism element is clamped in the photometry operation before photographing and a photograph is taken maintaining said condition, while in the case the photographing period is long, EE photographing takes place following the pointer each time.

DESCRIPTION OF THE PREFERRED EMBODIMENTS

Figure 1:
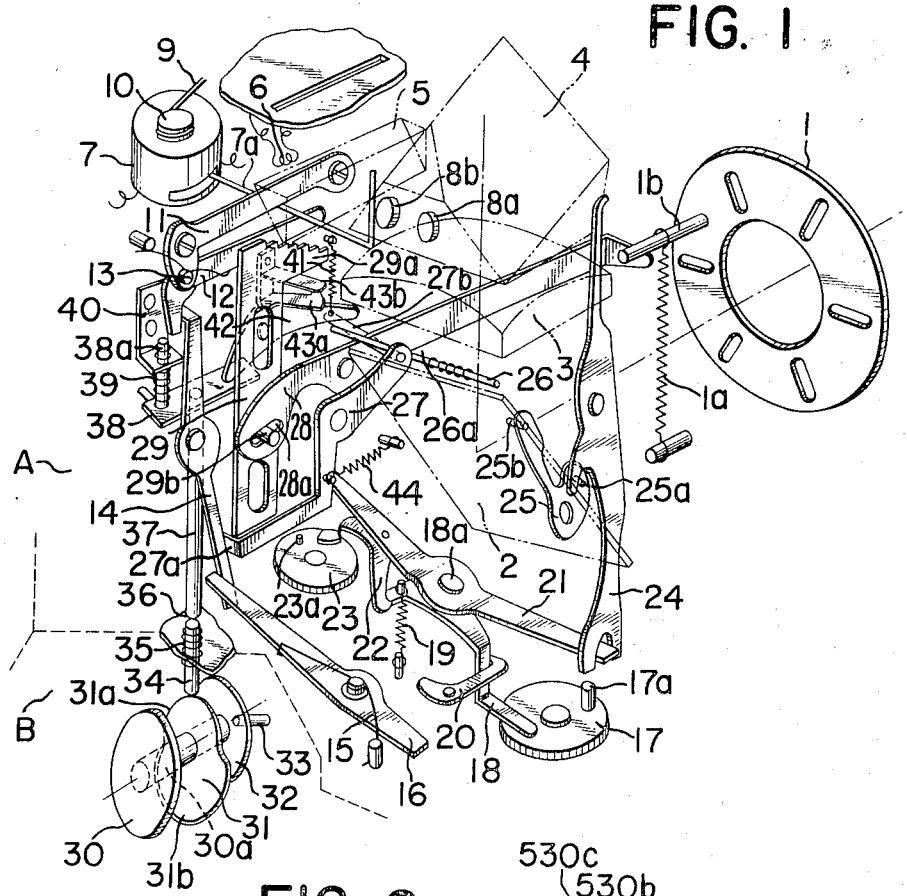
FIG. 1 is a constructional perspective view illustrating one embodiment according to the invention.

One embodiment of the invention will now be described. FIG. 1 illustrates a TTL photometry single lens reflex EE camera having a motor drive means detachably mounted wherein the camera side is designated as at A and the motor drive means at B. In this camera, before taking a photograph, a photographer can view a light beam from the photographing lens through a finder. That is, the light beam from the lens is reflected by a mirror 2 through a diaphragm 1 and thereafter reaches the eyepiece not shown through in order of a focusing screen not shown, a condenser lens 3, and a pentagonal prism 4 and to the photographer's eye. Also, the photographer can view through the finder an indicating red lamp, which indicates operation of EE mechanism through a prism 5, pentaprism 4, and eyepiece not shown, and a pointer 7a of the meter. This pointer 7a swings according to the intensity of illumination detected by light receiving elements 8a, 8b arranged behind the pentaprism 4. Further, the meter 7 is adapted to be rotated by a cord 9 and a pulley 10 according to a shutter speed and ASA sensitivity predetermined prior to shutter releasing. The pointer 7a of the meter 7 passes through a clearance formed by a stationary keep plate 11 and a rotatable clamp plate 12. This clamp plate 12 is forced to be rotated by a spring 13 in a counterclock-wise direction, and when rotated in a counterclock-wise direction, the pointer 7a of the meter is held against the keep plate 11. The clamp plate 12 is in engagement with one end of a rotatable lever 14 and is adapted to be rotated in a counterclock-wise direction when said lever 14 is released from its engagment. The other end of lever 14 is engaged with a release interlock lever 16 urged by a spring 15 in a clockwise direction and said release interlock lever 16 is rotated in a counterclock-wise direction by a preliminary action of shutter releasing by the release member not shown to release the engagement of the lever 14. A charge gear 17 is in response to the shutter charge and is provided with a pin 17a which rotates a charge lever 18 in a clockwise direction when shutter charge is taken place. This charge lever 18 is urged by a spring 19 in a counterclock-wise direction, and when rotated in a clockwise direction against said spring 19, the lever 18 is made in engagement with a lever 20 interlocked with the release member not shown. A reciprocating lever 21 is mounted coaxially 18a with the charge lever 18 and a release lever 22 is pivotably mounted in the central portion of one end of said reciprocating lever 21. One end of said release lever 22 is placed in engagement with the charge lever 18 rotated in a clockwise direction and is also adapted to be disengaged with the charge lever 18 by a pin 23a of a release gear 23, which is rotated by a rear screen signal of the shutter. A shutter release lever 24 has its one end engaged with one end of the reciprocating lever 21 and the other end of said shutter release lever 24 causes the front screen of shutter to be transported by rotation of the reciprocating lever 21 in a counterclock-wise direction. A pin 25a of a mirror up lever 25 is placed in engagement with a central curved portion of the shutter release lever 24, and this engagement causes said lever 25 to interlocking with the rotation of shutter release lever 24. This mirror-raising lever 25 moves the mirror 2 up and down by way of pin 25b with a shaft 26 wound with a spring 26a made as a center. One end of said reciprocating lever 21 is in engagement with a throttle lever 27 urged by a spring 44 in a counterclock-wise direction. This throttle lever 27 is adapted to be rotated in a clockwise direction by rotation of the reciprocating lever 21 in a counterclock-wise direction. One end of the throttle lever 27 constitutes a bent over portion 27a which is in contact with the other end of said lever 14. When the throttle lever 27 is rotated in a clockwise direction, the lever 14 rotates in a clockwise direction. Provided on the other end of the throttle lever 27 is a pin 27b which engages with one end of a communication lever 28 rotatable on the shaft 28b. One end of said communication lever 28 is urged by a throttle spring 1a to engage with a pin 1b of the said diaphragm 1. Accordingly, when the communication lever 28 is disengaged from the pin 27b of the throttle lever 27, the communication lever is rotated by the throttle spring 1a in a clockwise direction. A pin 29b of a sliding plate 29 provided with a saw-tooth 29a is fitted in a groove 28a formed in the other end of the communication lever 28, and when the communication lever 28 is rotated in a clockwise direction, the sliding plate 29 slides upwards till the sawtooth 29a impinges upon the needle 7a of the meter. A knob for setting a photographing period of motor drive, having a photometric mark 30a notched thereon is shown as at 30, and a cam 31 and a disk 32 are mounted on the shaft 30b of said knob 30. A brush 33 is attached to the disk 32 to vary resistance for setting a photographing period of motor drive. The cam 31 is provided with a concave portion 31a and a convex portion 31b, and in the case the photographing period is long, the concave portion 31a corresponds to the camera side A while when the period is short, the convex portion 31b corresponds thereto. A communication rod 34 is adapted to hit the cam 31 and is projected through a spring 35 from a cover 36 of the motor drive. There is shown a communication rod at 37 on the camera side, and a plate 38 is mounted on the upper end of said communication rod 37. A pin 38a is planted in the plate 38 and is inserted through a fixed plate 40 mounted on the camera body through a spring 39, so that the plate 38 is pressed downwards by a spring 39 and when the motor drive means is equipped, the communication rod 37 is always adapted to hit the communication rod 34. The plate 38 is provided with a stopper pin 38b which serves as a stopper for the plate 38 when the motor drive means is removed. One end of the plate 38 is in engagement with one end of a lever 42 urged by a spring 41 in a counterclock-wise direction, and the other end of said lever 42 is placed in contact with the pin 27b of the aforesaid throttle lever 27. When this lever 42 is engaged with the plate 37, contact 43a and 43b are made in contact so as to light said indicating lamp 6 through an electric circuit not shown. Further, when the plate 38 is pressed upwards, the lever 42 is rotated in a clockwise direction to rotate the throttle lever 27 in a clockwise direction and placing the contacts 43a and 43b in non-contact condition.

The operation of the just described construction will now be described. First, this concerns with the case in which the photographing period is set for a long time, that is, for example, when the photographing period is in excess of one second, the EE mechanism is followed to make it possible to obtain proper exposures each time of shutter release and the knob 30 is set for setting a photographing period of the motor drive to the aforesaid photographing period. When the shutter charge is carried out, the charge lever 18 is rotated in a clockwise direction by the pin 17a on the charge gear 17 to engage with the lever 20 and the release lever 22, being charged in the condition as shown. Then, when the shutter release is carried out, the lever 16 is rotated in a counterclock-wise direction by being interlocked with the release member not shown through its preliminary action. Thereby the lever 14 becomes free and the clamp plate 12 rotates in a counterclock-wise direction, and the pointer 7a of the meter, which swings according to the intensity of illumination detected by the light receiving elements 8a, 8b, is held by the keep plate 11. When the shutter release is further carried out, the lever 20 interlocks with the release member to be rotated in a clockwise direction, thus disengaging from the charge lever 18. Accordingly, by engagement of the release lever 22, the reciprocating lever 21, charge lever 18, and release lever 22 collectively rotate in a counterclock-wise direction on the shaft 18a. Then, the shutter release lever 24 is rotated in a counterclock-wise direction so that the mirror raising lever 25 rotates in a clockwise direction to raise up the mirror 2 on the shaft 26 by means of a pin 25b of said lever 25, causing the front screen of the shutter to be transported by the upper end of the shutter release lever 24. At the same time, the other end of the reciprocating lever 21 causes the stopping lever 27 to be rotated in a clockwise direction against the spring 44, the pin 27b by which the communication lever 28 has been held escapes from the communication lever 28, which follows the pin 27b by the stopping spring 1a on the axis of the shaft 28b for the clockwise rotation. Accordingly, the sawtooth 29a of the sliding plate 29 is moved upwards by the pin 29b fitted in the groove 28a of the communication lever 28 till it hits the needle 7a of the meter clamped in advance by the clamp plate 12, and stops at the position which corresponds to the position of swing of the needle 7a of the meter. Therefore, the communication lever 28 also stops, and the diaphragm 1 of the photographing lens, which has followed the communication lever 28 through the pin 1b, is stopped down to the diameter corresponding to the vibration position of the needle 7a of the meter. Then, when the rear screen of the shutter travels at the end of the exposures, the release gear 23 rotates and the release lever 22 is knocked by the pin 23a to disengage the release lever 22 from the charge lever 18. As a result, the reciprocating lever 21 is rotated by the spring 26 in a clockwise direction and the shutter release lever 24 is also rotated in a clockwise direction. Then, the mirror raising lever 25 rotates in a counterclock-wise direction to let the mirror 2 down by the spring 26a, and at the same time the stopping lever 27 rotates in a counterclock-wise direction by the spring 44 and the communication lever 28 also rotates in a counterclock-wise direction. Therefore, the pin 1b moves upwards returning the diaphragm to be open. Further, the saw-tooth 29a of the sliding plate 29 moves downwards to release the pointer 7a of the meter so that one cycle of a photographing in the case of the longer photographing period may be completed. In this case, the interlock lever 42 is held stopped by the spring 41 in the position determined by the plate 38 and the contacts 43a, 43b are made in contact by the back thereof, and lighting the indicating lamp 6 through the electric circuit, which indicates that the EE mechanism is in operation with respect to the finder through the prism 5 and the pentaprism 4. The pointer 7 of the meter is also visible through the finder.

The operation in the case of a short photographing period will now be described. First, the photometry is carried out prior to starting photographing. That is, the dial 30 for setting a photographing period of motor drive is set to the photometric mark 30a. At the time when set to the photometric mark 30a, the communication rod 37 does not move upwards so that the plate 38 does not move upwards. Accordingly, the lever 42 causes the contacts 43a, 43b to be made in contact to light the indicating lamp 6, which indicates that EE mechanism is in operative position. In this condition, when the camera is directed towards the object, the pointer 7a of the meter swings according to the brightness of the object. Then, the dial 30 for setting a photographing period of motor drive is set to the desired position of short period, so that the cam 31 rotates and the concave portion 31b hits the communication rod 34. The communication rods 34, 37 and plate 38 move upwards against the springs 35, 39 to rotate the lever 42 in a clockwise direction and to move downwards the pin 27b. Similarly, the communication lever 28 rotates in a clockwise direction and the saw-tooth 29a of the sliding plate 29 moves upwards to clamp the pointer 7a of the meter, throttling the diaphragm 1 according the position thereto. At the same time the bent portion 27a of the lever 27 pushes the lever 14 so that the lever 14 rotates in a clockwise direction. Then, the clamp plate 12 is rotated by the spring in a counterclock-wise direction to hold the pointer 7a of the meter. The lever 42 rotates in a clockwise direction to release the contact of contacts 43a, 43b and thus the lamp 6 goes off. Thereby, it can be assured in the finder that EE mechanism is in inoperative. In this condition, when the shutter release is carried out, the lever 27 is in the condition rotated in a clockwise direction so as to be escaped from the reciprocating lever 21. Accordingly, the interlock by the shutter release is effective only relative to the reciprocating lever 21, not after the lever 27. That is, the mirror up-and-down action is effected in the inoperative condition of EE mechanism. The clockwise rotation of the lever 27 rotates the lever 14 in a clockwise direction. So, the lever 16 is in the condition rotated in a counterclock-wise direction and the preliminary interlock of the shutter release is not effective relative to the lever 16. Thus, when the photographing period is set to the short time, photographing is made possible maintaining the exposure made prior to photographing, while performing a quick return action of the mirror.

Figure 2:
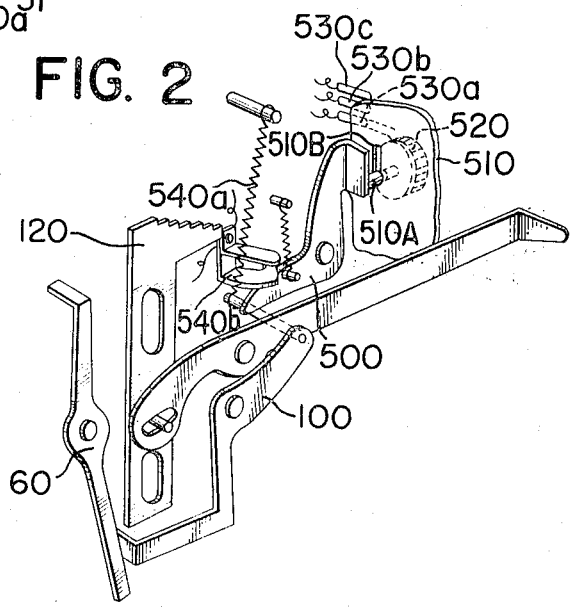
FIG. 2 is a constructional perspective view illustrating another form of embodiment according to the invention.

Now, another form of embodiment according to the invention will be described, though omitting the description identical with portions shown in FIG. 1. FIG. 2 illustrates a motor drive means built-in type TTL single lens reflex camera. When a photographing period setting button 510 is depressed to set to a suitable photographing period, contact 520 attached to the button 510 is placed in contact with either contacts 530a, 530b, or 530c, so that a desired photographing period may be obtained. The contact 520 is in contact with the contact 530a without depressing the button 510. FIG. 2 illustrates the case in which the photographing period is set to the long time and the contact 520 is made in contact with the contact 530a, and the button not being depressed. In this case, therefore, the lever 500 is not rotated in a counterclock-wise direction, thus EE mechanism being operable similarly to the previous case. Then, when the contact 520 is made in contact with either contact 530b or 530c, the EE mechanism is not possible to be followed such as in the case of short photographing period. In this case, the button 510 is depressed to be able to push it up. When the button 510 is depressed, a slit 510B is fitted in a step portion of shaft 510A thereof and by pushing up the button the desired position for setting a photographing period can be maintained in the condition that the button 510 is held depressed. This operation is carried out at the time of performing photometry by directing the camera towards the object. Since the button is depressed, the lever 500 is rotated in a counterclock-wise direction and a saw-tooth 120 holds the pointer of the meter similarly to that shown in FIG. 1, which shows the detachable motor drive means, the lens is stopped to the stopped down diameter according thereto. At the same time, the lever 160 is also rotated in a clockwise direction by the stopping lever 100 and the clamp plate 200 simultaneously holds the pointer of the meter. Then, when the shutter release is carried out, photographing can be repeated in the inoperative condition of EE mechanism while holding the pointer of the meter. Further, contacts 540a, 540b, which are identical with the contacts 43a, 43b as shown in FIG. 1, are positioned behind the lever 500 and are made in contact or in noncontact according to the movement of the lever 500, indicating the operative or inoperative condition of EE mechanism within the finder in a similar manner to that shown in FIG. 1. Furthermore, if the button 510 is set to such a position that the contact 50a is made in contact with the contact 520 (namely, the position for a long photographing period) and is depressed, it becomes possible to view only depth of the object by diaphragm.

Although the foregoing embodiments have been described with respect to the case of shutter preference, the invention is not limited thereto but may take the diaphragm preference. In this case, the diaphgragm 1 is replaced by a shutter time setting governor so that the meter 7 may be rotated according to the diaphragm, thus providing a diaphragm preference with the same embodiment as that of the foregoing.

As described above, this motor drive means detachable or built-in type TTL photometry single lens reflex EE camera enables the repetition of photographing, in the case of short photographing period, in such a manner that a pointer Of the meter is clamped in photometry prior to photographing and the shutter is released while the EE mechanism is made inoperable, maintaining the just described condition with a quick return operation of mirror. Further, if the photographing period is set to a long time the EE mechanism is activated so as to follow the needle of the meter, thus enabling the repetition of photographing and preventing the position of the needle of the meter at all times from being improper due to its deviation caused by mechanical vibration. Furthermore, retaining or following exposures can be indicated by a lamp in the finder.

We claim:

1. Camera having an automatic exposure control device comprising in combination:
   a light receiving element;
   exposure signal holding means for holding an exposure signal responsive to the output from the light receiving element;
   exposure control means for controlling an exposure factor responsive to the exposure signal, said exposure control means being arranged to cooperate with said exposure signal holding means;
   retaining means for retaining said signal holding means in holding condition for rapid sequence exposures, regardless of successive camera release operations; and
   setting means for changing over said retaining means from non-retaining condition to retaining condition, whereby rapid sequence exposures may be made without successive exposure signal holding operations.

2. Camera according to claim 1, which further comprises an interval timer for defining the time interval between an exposure and the next exposure, said interval timer being adapted to cooperate with the setting means.

3. Camera according to claim 1, which further comprises displaying means for indicating whether the retaining means is in the retaining condition or not.

4. Camera according to claim 1, which further comprises an accessory unit adapted to cooperate with a camera unit in which accessory unit a setting member of the setting means is provided.

* * * * *

UNITED STATES PATENT OFFICE
CERTIFICATE OF CORRECTION

Patent No. 3829868            Dated August 13, 1974

Inventor(s)     Hiroshi Aizawa et al.

It is certified that error appears in the above-identified patent and that said Letters Patent are hereby corrected as shown below:

After the listing of the inventors names appearing on the first page of the patent and before the listing of the filing date, please insert a paragraph listing the assignee as follows:

-- Assignee:    Canon Kabushiki Kaisha
                       Tokyo, Japan  --.

Signed and Sealed this eleventh Day of November 1975

[SEAL]

Attest:

RUTH C. MASON
*Attesting Officer*

C. MARSHALL DANN
*Commissioner of Patents and Trademarks*